United States Patent [19]

Moore

[11] 4,161,820
[45] Jul. 24, 1979

[54] APPARATUS FOR CUTTING VEGETATION

[75] Inventor: James L. Moore, Houston, Tex.

[73] Assignee: Weed Eater, Inc., Houston, Tex.

[21] Appl. No.: 846,288

[22] Filed: Oct. 28, 1977

[51] Int. Cl.² .................. A01D 55/18; A01G 3/06
[52] U.S. Cl. .................................. 30/276; 56/12.7
[58] Field of Search ............ 30/276, 347; 56/12.7; 51/335

[56] References Cited

U.S. PATENT DOCUMENTS

| | | | |
|---|---|---|---|
| 4,091,536 | 5/1978 | Bartholomew | 30/276 |
| 4,097,991 | 7/1978 | Prouly | 30/276 |
| 4,107,901 | 8/1978 | Moore | 56/17.5 |
| 4,118,864 | 10/1978 | Pittinger | 30/276 |

Primary Examiner—Jimmy C. Peters

[57] ABSTRACT

Apparatus for cutting vegetation with a rotating head carrying cutting line extended into a cutting plane. Additional line is extended into the cutting plane by pushing a ball member against the ground while rotating the head. The ball member moves inwardly for releasing a spool carrying coiled cutting line to rotate a predetermined angular displacement in the head. After the cutting line length is extended, the spool is secured automatically against further rotation within the head.

A cover is releasably secured to the head by a twist-lock connection to allow the ball member and spool to be removed from the head for rewinding, etc. The ball member and spool are journaled within the head and cover for rotation about a common rotational axis with the head and each other. As a result, head balance and smooth rotation are maintained during repeated extensions of cutting line.

16 Claims, 5 Drawing Figures

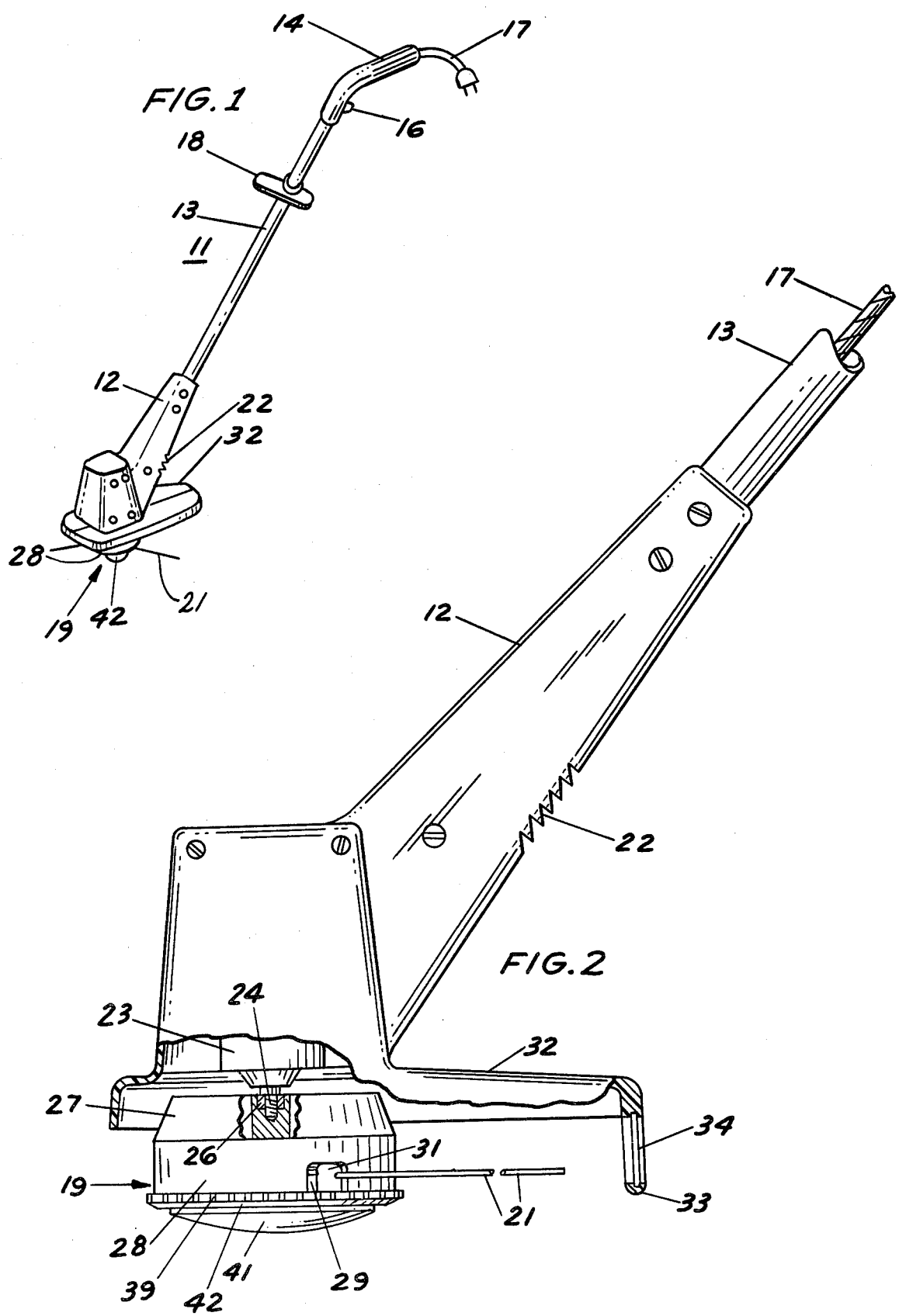

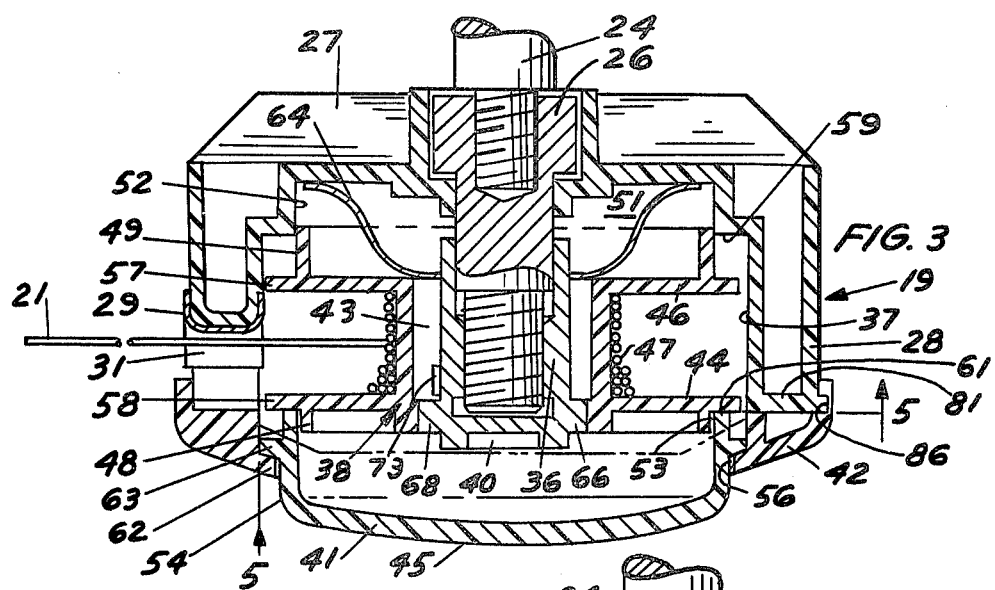
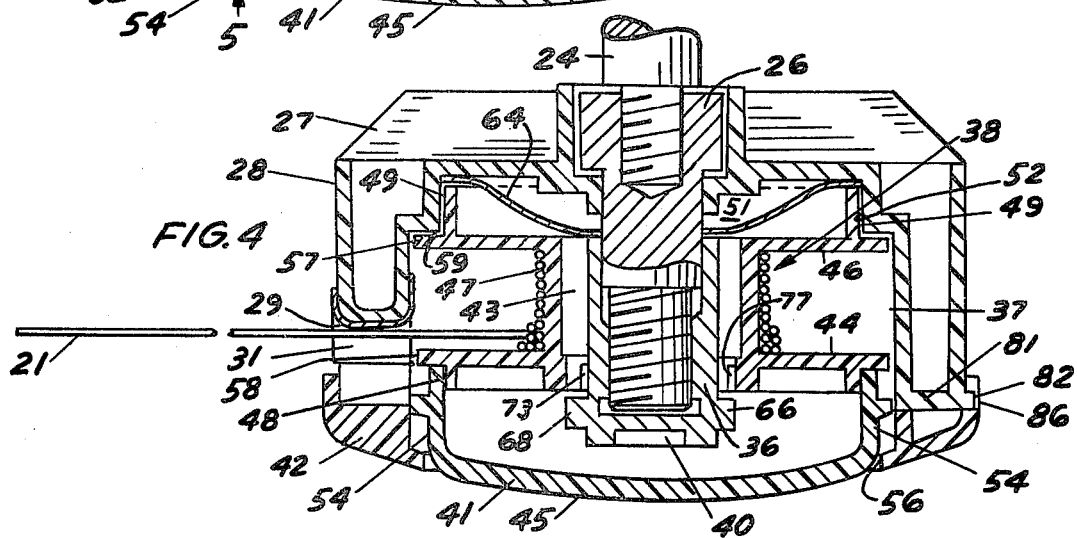
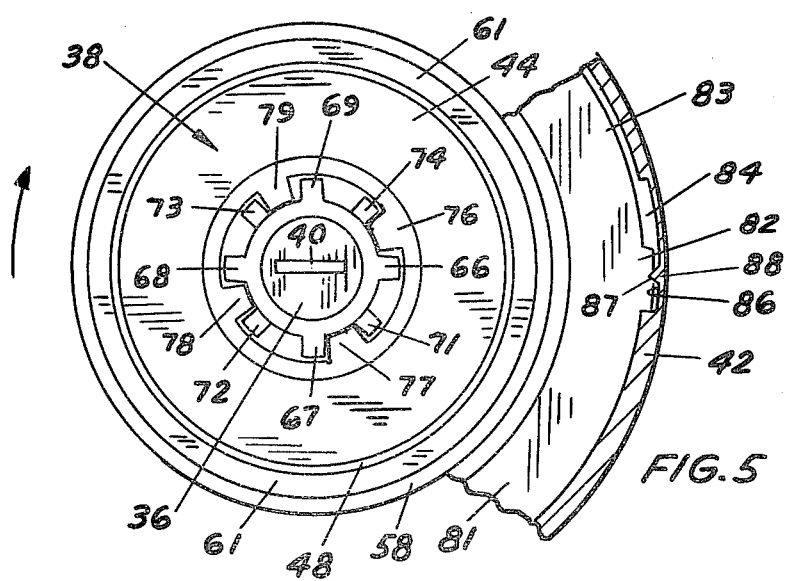

APPARATUS FOR CUTTING VEGETATION

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, and 3,859,776. These patented devices have met outstanding success in that these American developments are probably the safest electrial or gasoline-powered tools yet invented for vegetation cutting, edging and trimming operations.

The devices shown in these patents employ a flexible cutting line, such as manufactured from Nylon ® polymer. The cutting line is carried upon a spool internally of a rotating head. When desired to replenish the line or to extend an additional length of it, the rotation of the head was stopped and line manually extended from the head by either (1) uncoiling directly from the head; or (2) unlocking an internal spool, pulling the line from the head to the desired length and releasing the locking mechanism so that the spool was again secured rotation in the head. These structures in the patented devices have been found to be convenient, simple and reliable. In many of the smaller devices, especially those powered by electric motors, a simpler system to extend the cutting line from the head was desired. The present invention is a device for cutting vegetation in the nature of the patented devices, wherein a simple but reliable mechanism is employed for extending selectively the cutting line in a certain length from the head. More particularly, this novel apparatus is simple to operate and has no complicated mechanisms. A ball member on the head is depressed. Then, the line is pulled from an internal spool released for rotation in the head, until a certain length is withdrawn. Now, the spool is relocked to the head. The line may be pulled manually from the head by the user. Preferably, the head is rotated to pull the line from the head by centrifugal force. Other features of the present invention will be apparent from the following description.

SUMMARY OF THE INVENTION

In accordance with this invention, there is provided an apparatus for cutting vegetation which has a head rotatable about an axis of rotation and an integral drive connection extending from a first face. A second face on the head carries a button member. A spool is carried in an open-ended cavity in the head. A flexible, non-metallic cutting line is coiled about the spool and has a free end extending outwardly of the head into a cutting plane. The button member is mounted for manually-induced axial movement to an inward station from an outward station in the head. A cover is releasably secured to the head for containing the button member and spool against a biasing means which moves them axially into the outward station. The cover, button, spool and the head carry internested cylindrical surfaces for their rotation relative to each other and to the head about its rotational axis. Annular flanges on these elements limit longitudinal displacement relative to one another. A locking means on the head is received within a central opening on the spool. The locking means is adapted to be activated by the button member in the inward station for releasing the spool for rotation through a pre-determined angular displacement for extending a certain length of cutting line from the head into the cutting plane. At this occurrence, the locking means secures the spool against rotation relative to the head.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 3 is a vertical section, in enlargement, taken through the head of the apparatus shown in FIG. 2;

FIG. 4 is a vertical section of the head as shown in FIG. 3 but with its spool in cutting line extension condition; and FIG. 5 is a partial cross-section of FIG. 3 taken along line 5—5, showing the teeth locking the spool to the head so not cutting line is being extended.

DESCRIPTION OF SPECIFIC EMBODIMENTS

Referring to FIG. 1, there is shown an apparatus for cutting vegetation, which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a rotatable head 19 with a non-metallic cutting line 21. Rotation of the head 19 about an axis passing through the housing 12 extends the cutting line 21 into a cutting plane which is substantially perpendicular to the axis of rotation of the head.

In FIG. 2, there is shown an enlargement of the housing 12 carrying a plurality of air induction openings 22. These openings introduce a flow of cooling air over the prime mover contained in the housing 12. In the particular embodiment being described, the housing 12 includes an electric motor 23 which has a downwardly-extending drive shaft 24. The head 19 is threadedly connected to the shaft 24 by an integral metal adaptor 26. The adaptor 26 extends from the upper face of the head 19 and may be surrounded by a plurality of vanes 27 serving as a centrifugal blower for moving air radially outwardly from the head 19 during its rotation. As a result, the induced flow of air cools the motor 23 within the housing 12. The head 19 includes a hub 28, a cover 42 and button or ball member 41. The hub carries in its side peripheral surface an aperture 31 through which the cutting line 21 extends radially outwardly into the cutting plane. The cover 42 is releasably secured to the hub 28 and may carry a plurality of finger-grip ridges or projections 39.

The housing 12 includes a rearwardly-extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly-extending projection 33 in which is embedded a metal cutting blade 34. As a result, the cutting line 21 rotated by the head 19 can never have an operating length greater than the distance from the axis of rotation to the cutting blade 34, since any greater length will automatically be severed.

The head 19, as seen in FIG. 3, is disc-like with a smooth peripheral side surface which has the aperture 31 through which the cutting line 21 extends into the cutting plane. Also, a metal curvilinear bearing surface 29 covers the leading and trailing edges of the aperture 31. If more than one cutting line is used, each line should have a separate aperture and bearing surface. The hub 28 on one face carries integrally the adapter 26 in which the drive shaft 24 is threaded. In addition, the adapter 26 extends axially through the head 19 to form a convenient threaded mount for a post member 36. Preferably, the post member 36 is cylindrical with a screwdriver slot 40.

The interior of the hub 28 is an open-ended cavity with a cylindrical wall 37 in which is disposed a spool 38. The spool 38 is mounted for independent rotation relative to the head 19. For this purpose, the spool has spaced-apart flanges 44 and 46, and a central axial opening 43 to receive the post member 36. The flanges 44 and 46 have circular peripheries which fit closely to the cylindrical wall 37. As a result, the spool 38 is journaled snugly within a cylindrical wall 37, so that the cutting line 21 at its smallest dimension cannot be trapped within the resultant annulus. The cylindrical wall 36 and spool 38 are concentric with the rotational axis of the head 19. Preferably, the post member 36 is threaded tightly upon the adapter 26 so as to be integrally connected to the hub 28. A supply of the cutting line 21 is coiled upon the spool 38 in several layers 47 between the flanges 44 and 46. The interior end of the coiled cutting line 21 is secured to the spool 38. The other end of the cutting line 21 extends outwardly of the head through the aperture 31.

The exposed surface 45 of the head 19, and especially the ball member 41, are preferably of convex configuration, smooth in contour and without substantial projections and recesses capable of trapping appreciable vegetation. Preferably, the surface 45 is spherical and coaxially aligned with the axis of rotation of the head 19. Stated in another manner, all parts of the surface 45 are unbroken in the line of travel during rotation of the head 19. However, this surface 45 may be curved or multi-planar on a radial line extending across the head. In this manner, the surface 45 will travel freely through the vegetation being cut, without appreciable loading of the electric motor 23.

The spool 38 fits loosely in a telescoped relationship over the post member 36 and these parts will include the locking mechanism that regulates cutter line extension from the head 19. However, these elements do not provide any axial or angular bearing functions in the head 19, as will be apparent from the description that follows. This arrangement prevents debris, etc., from collecting in the locking mechanism, since debris will move radially out of the head 19 through aperture 31.

The cover 42, ball member 41, spool 38 and hub 28 have internested cylindrical bearing surfaces, which are low-friction journal means, spaced intermediate the axial opening 43 and the cylindrical wall 37. These surfaces are coaxial to the rotational axis so that the ball member and spool are journaled for common rotation relative to the head 19, one another and to the cover 42 and hub 28. With this arrangement, all parts of the head 19 rotate in common about its rotational axis. An important result is that the head's balance and smooth rotation is maintained through repeated extensions of cutting line without wobbling problems. These parts also have annular flanges, preferably with bearing end surfaces normal to the rotational axis, for limiting longitudinal displacements relative to one another and the head 19.

For example, the spool 38 has cylindrical bearing surfaces 48 and 49 of equal diameter. The hub 28 has a cylindrical recess 51 adjacent the vanes 27 with an interior cylindrical surface 52 to journal bearing surface 49. The ball member 41 has an interior cylindrical surface 53 to journal bearing surface 49, and an exterior cylindrical surface 54 to journal an interior bearing surface 56 on the cover 42. In like manner, the spool 38 has the flanges 44 and 46 adapted to form annular flanges 57 and 58 which abut the shoulder 59 in the hub 28 and the rim 61 of the ball member 41. The cover 42 has an annular flange 62 which abuts upon an annular flange 63 carried interiorly on the ball member 41. A biasing means, such as a ring-like Belleville spring 64, urges the spool 38 and ball member 41 into the outward station. With this arrangement, the ball member 41 and spool 38 are journaled to each other and also to the hub 28 and cover 42 about a common axis, e.g., the rotational axis of the head 19. Thus, the head 19 in operation, irrespective of cutting line extension, always has all of its parts journaled in common to each other and to the rotational axis. This arrangement of the head reduces wobbling problems and enhances smooth rotation, especially at high speeds.

The ball member 41 and spool 38 together move axially along the rotational axis as a unit from the outward station of FIG. 3 to the inward station of FIG. 4. Only at the inward station can cutting line 21 be extended by rotation of the spool 38 relative to the hub 28. For this purpose, it is preferred to have the head 19 rotating at operative speeds and press the ball member 41 against the ground to move the ball member to its inward position as seen in FIG. 4. The spool 38 is now released by locking elements to rotate relative to the hub 28 and extend cutting line 21 into the cutting plane. The locking elements can have any form that (1) secures the spool to the hub when the ball member is in the outward station; and (2) when the ball member is moved to the inward station, for releasing the spool to rotate within the hub through a predetermined angular displacement for extending a certain length of cutting line from the head into the cutting plane, and then, securing the spool against any further rotation relative to the hub.

Locking elements are provided on the post member 36 and the spool 38 within the axial opening 43 so that when the ball member 41 is in the outward station, the spool is secured against rotation relative to the head 19. As a result, the cutting line 21 cannot be withdrawn from the spool, either manually or by centrifugal forces arising from rotation of the head 19. Various forms of locking structures may be employed for this purpose, such as an arrangement of toothed projections or recesses in the nature of an escapement.

A plurality of teeth forming a preferred escapement is shown in FIG. 5. For example, the post member 36 carries uniformly-spaced teeth 66, 67, 68 and 69. The post member also carries a group of teeth 71, 72, 73 and 74 which are angularly offset to the group of teeth 66–69. With the ball member 41 at the outward station, the spool has teeth 76, 77, 78 and 79 to engage the teeth 66–69 on the post member 36. Also, the teeth 71, 72, 73 and 74 are spaced axially from the teeth 66–69. The teeth 71–74 on the post member 36 engage teeth 76–79 on the spool 38 when the ball member 41 is at the inward station.

With the ball member 41 in the outward station, the post member's teeth 66–69 are in abutment with the spool's teeth 76–79, respectively. These engaged teeth prevent the spool 38 from rotating clockwise relative to the head 19 responsive to pull of the cutting line which is wound counterclockwise. (Assume the head 19 is also rotating clockwise). With the ball member 41 moved axially to its inward station into the head 19 as shown in FIG. 4, the group of teeth 71–74 will now be engaged by the teeth 76–79 on the spool but only after the spool 38 has rotated a prescribed angular displacement relative to the head 19. Under these conditions, the spool 38 rotates in the clockwise direction until the group of offset teeth 71–74 are engaged by the teeth 76–79. Now, the ball member 41 is released and the spring 64 returns the ball member to its outward station. At this time, the spool 38 rotates clockwise the same predetermined angular movement between the offset teeth as before until the teeth 76–79 on the spool engage the teeth 66–69 on the post member 36. The spool 38 is again secured to the head 19 against further rotation. As a result, the spool 38 has been rotated in the hub 28 a predetermined angular displacement with the ball member 41 moving from the outward station to the inward station, and back again to the outward station. As a result, a certain length of cutting line 21 has been unwound from the spool 38 and extended from the head 19.

The locking mechanism of the present apparatus may be activated by (1) stopping the rotation of the head; (2) manually moving the ball member to the inward position; (3) pulling upon the cutting line; and (4) releasing the ball member to allow the spool to complete its rotation while yet pulling upon the cutting line 21. Preferably, the operation is performed (with the electric motor 23 rotating the head 19) by the operator pressing the ball member onto the earth's surface whereby the ball member moves to its inward station. Then, the operator raises the head 19 slightly to remove contact of the ball member with the earth's surface and the ball member returns to its outward station. As a result, the extension of the cutting line 21 is completed very simply and automatically by the novel structure employed in the trimmer 11.

The cover 42 may be releasably secured to the hub 28 by any system. Preferably, a twist lock arrangement is used. For this purpose, the hub 28 has an annular lip 81 which carries one or more lugs 82. The interior surface 83 of the cover 42 carries axial openings 84 to allow the lugs to axially enter the cover as it is slipped about the hub 28. The cover 42 also has an annular groove 86 into which the lug 82 slides during rotation of the cover on the hub. Placement of the lug into the groove secures the cover and hub into an integral assembly. Preferably, the cover rotates to lock the lug 82 into the groove 86 counter-directionally to the direction in which the head 19 rotates during operation. Thus, vibrations during head rotation cannot loosen the cover from the hub. If desired, a detent (e.g. notch 87 and pin 88) can provide a positive lock between the cover and hub.

The axial spacing of the teeth at different horizons on the spool 38 is correlated to the spacings of the teeth carried upon the post member 36 and the distance the ball member moves axially between inward and outward stations. Preferably, the spacings are such that the post member's teeth 66–69 come out of engagement with the spool's teeth 76–79 as they come into engagement with the lower post member's teeth 71–74. As a result, the spool cannot "freewheel" about the post member, either by a manual pull upon the cutting line 21 or as a result of centrifugal force from rotation of the head 19. Preferably, the engaging surfaces between the teeth are sufficient in planar contact area so that the teeth cannot be moved axially out of engagement by any casual or unintended pressing of the ball member against the earth's surface. As a result, the cutting line cannot be unintentionally extended from the head 19 by the use of the trimmer 11. The angular spacings between adjacent teeth and the number of teeth will, of course, determine the angular movement of the spool relative to the hub.

Although the head 19 in all its elements may be formed of metal, plastic or other material, it is preferred to use rather inexpensive polymeric materials which are readily fabricated by high-speed molding operations. The spool 38 can carry sufficient cutting line 21 (e.g., 0.065–0.100 inch in diameter Nylon ® polymer) for several years' vegetation cutting before requiring a new supply of cutting line. When desired, the cover 42 is readily removed from the hub 28 and the spool 38 rewound or replaced with another having a fresh supply of the cutting line 21.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:
1. An apparatus for cutting vegetation, comprising:
 (a) a head rotatable about an axis of rotation with an integral drive connection carried on a first face and a second face having a smooth surface free of projections and recesses capable of trapping appreciable vegetation, and said head having an open-ended cavity with a smooth cylindrical wall coaxial to the rotational axis;
 (b) a spool mounted in said cavity and having spaced-apart flanges defining a storage zone for cutting line, said flanges provided with two circular peripheries adapted to be journaled snugly within said cylindrical wall, and said spool having an axial opening;

(c) at least one flexible, non-metallic cutting line coiled in said storage zone of said spool and having a free end extending outwardly from said head into a cutting plane;

(d) a circular button member carried on said head and mounted for manually-induced axial movement from an outward station into said head to an inward station;

(e) a cover removably secured to said head to contain said button member and spool member and biasing means for urging said button member and spool towards the outward station;

(f) said cover, button member and spool having internested cylindrical bearing surfaces spaced intermediate of said axial opening and said cylindrical wall, said bearing surfaces forming low-friction journal means for common rotation relative to one another and said rotational axis; and (g) locking means on said head and received within said central axial opening of said spool, said locking means adapted to be activated by said button member in the inward station for releasing said spool for rotation within said head through a predetermined angular displacement for extending a certain length of cutting line from said head into said cutting plane whereat said locking means secure said spool against rotation relative to said head.

2. The apparatus of claim 1 wherein said head and said spool have internested cylindrical bearing surfaces spaced intermediate of said axial opening and said cylindrical wall, said internested cylindrical bearing surfaces forming low-friction journal means for common rotation relative to one another and said rotational axis.

3. The apparatus of claim 2 wherein said head and said spool have annular flanges providing end bearing means for limiting longitudinal displacements relative to each other.

4. The apparatus of claim 1 wherein said cover, button member and said spool have annular flanges providing end bearing means for limiting longitudinal displacements relative to each other.

5. The apparatus of claim 4 wherein said head and said spool have internested cylindrical bearing surfaces spaced intermediate of said central axial opening and said cylindrical wall forming low-friction journal means for common rotation relative to one another and said rotational axis, and a spring providing said biasing means contained between said spool and said head and enclosed by said internested cylindrical bearing surfaces.

6. The apparatus of claim 5 wherein said spring is an annular Belleville member symmetrical about said rotational axis in biasing said spool and said button member towards the outward station whereby said button member and spool move axially within said head without significant radial movement sufficient to induce unbalanced vibration during high-speed head rotation.

7. The apparatus of claim 1 wherein said axial opening in said spool telescopes over an axial post member integral with said head and said spool and post member carry said locking means including complementary teeth means forming an escapement to regulate independent rotation of said spool to the predetermined angular displacement in said head.

8. The apparatus of claim 7 wherein said locking means employ said teeth means to secure said spool against rotation relative to said head with said button member returned into the outward station by said biasing means.

9. An apparatus for cutting vegetation, comprising:

(a) a head rotatable about an axis of rotation with an integral drive connection carried on a first face and a second face having a projecting ball member adapted to be moved selectively to an inward station;

(b) a reel-like spool having spaced-apart flanges forming a storage zone for cutting line and an axial opening therethrough;

(c) at least one cutting line coiled in said storage zone of said spool and having a free end extending outwardly from said head into a cutting plane;

(d) a cover releasably secured to said head at its second face and said cover adapted to contain said ball member and spool member in said head and biasing means for returning said button member towards an outward station;

(e) said ball member, said spool, said cover and said head having (1) internested cylindrical bearing surfaces providing low-friction journal means for common rotation relative to one another and to said rotational axis, and (2) annular flanges providing end bearing means for limiting longitudinal displacements relative to each other; and (f) locking means on said head and received within said axial opening of said spool, said locking means activated by said ball member being moved into the inward station for releasing said spool for rotation within said head through a predetermined angular displacement for extending a certain length of cutting line from said head into the cutting plane whereat said locking means secure said spool against rotation relative to said head.

10. The apparatus of claim 9 wherein said spool telescopes with the axial opening about a cylindrical post member integral with said head, and said spool and post member carry said locking means including loose-fitting complementary teeth means forming an escapement to regulate independent rotation of said spool to the predetermined angular displacement in said head.

11. The apparatus of claim 10 wherein said spool has flanges with equal diameter circular peripheries and said head has an open-ended cavity therein with a cylindrical wall coaxial with the rotational axis, and said flanges on said spool journaled within said cylindrical wall with the circular peripheries of said flanges spaced from said cylindrical wall by a dimension less than the least dimension of each said cutting line.

12. The apparatus of claim 10 wherein said annular flanges on said ball member, said spool, said cover and said head have planar end bearing surfaces normal to the rotational axis.

13. The apparatus of claim 11 wherein the diameter of said cylindrical wall is greater than the diameter of the cylindrical bearing surfaces on said ball member and said spool whereby said cover can be removed from said head, and said ball member and spool removed axially from said post member.

14. The apparatus of claim 13 wherein said cover and said head carry complementary twist-lock projections and grooves.

15. The apparatus of claim 14 wherein said twist-lock projections and grooves on said cover and head are arranged to rotate into a secured condition in counter-rotation with the normal rotation of said head during use.

16. The apparatus of claim 13 wherein said cover and head carry detent means to insure a locked condition.

* * * * *